(12) United States Patent
Ecklein

(10) Patent No.: US 6,378,419 B1
(45) Date of Patent: *Apr. 30, 2002

(54) MATURATION PROCESS FOR WINES

(76) Inventor: Bryce A. Ecklein, 1017 W. Armour St., Seattle, WA (US) 98119

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,229

(22) Filed: Jan. 4, 1999

(51) Int. Cl.[7] ................................................. C12F 1/00
(52) U.S. Cl. ................... 99/277.1; 426/330.4; 426/422
(58) Field of Search ............................. 426/330.4, 422, 426/592; 99/277.1

(56) References Cited

U.S. PATENT DOCUMENTS

| | | | | |
|---|---|---|---|---|
| 429,826 A | * | 6/1890 | Wagoner | 99/277.1 |
| 818,478 A | * | 4/1906 | Shwayder | 99/277.1 |
| 2,017,235 A | * | 10/1935 | Drew | 99/277.1 |
| 2,108,661 A | * | 2/1938 | Farrier et al. | 99/277.1 |
| 2,114,009 A | * | 4/1938 | Ramsay | 99/277.1 |
| 2,203,229 A | * | 6/1940 | Nilsson et al. | 99/277.1 |
| 3,942,423 A | * | 3/1976 | Herzfeld | 99/277 |
| 4,073,955 A | | 2/1978 | Koppelman | 99/277.1 |
| 5,537,913 A | * | 7/1996 | Vowles | 99/277.1 |

FOREIGN PATENT DOCUMENTS

| | | | |
|---|---|---|---|
| SU | 123921 | * | 7/1959 |
| SU | 496303 | * | 8/1973 |

* cited by examiner

*Primary Examiner*—Curtis E. Sherrer

(57) ABSTRACT

A superior device for maturing wine which utilizes one or more cored oak slabs inserted into airtight containers of various volumes and materials whereby controlled oxidation of the wine may occur through the oak without prospect of air contamination or excessive loss of wine volume. The disclosure describes application to volumes ranging from 5 gallons to 5000 gallons (and more) and to vessels made of food grade plastic, stainless steel or white oak.

4 Claims, 1 Drawing Sheet

MATURATION PROCESS FOR WINES

CROSS REFERENCE TO RELATED APPLICATION

Figure 1:
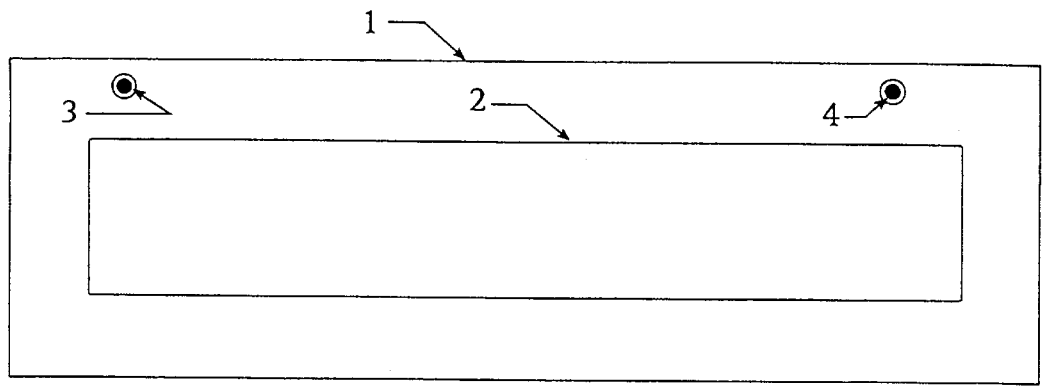

NOT APPLICABLE.

REFERENCE TO MICROFICHE APPENDIX

Not applicable.

BACKGROUND OF THE INVENTION

1. Field of the Invention

This invention relates to a universal device for fitting containers of various materials and design to allow maturation of wine. The centuries old tradition for maturation of fine wines has been based on the use of oak barrels. Initially barrels were made of French oak and more recently the manufacture often includes American oak of various species. The quality of wine matured in oak barrels is generally held to be superior to wine that is aged without the benefit of oak. While not all the parameters of barrel aging are totally understood, there is clearly a desired taste imparted by the oak and a softening of wine chemistry (especially tannins) that occurs through the controlled and very slow oxidation that occurs through the walls of the oak barrel.

2. Description of the Prior Art

Barrel making is a craft developed over the centuries, reliant both on skilled labor and extensive hand work. As such, the product is expensive and utilized in the wine making industry for only the finer wines. The barrel itself, for all the subtle qualities it imparts in the wine, is plagued with several shortcomings with which the industry has learned to live. Specifically, barrels can only be used one or two times before they lose their chemistry. At that point they must either be discarded or retrofitted in some manner such as with internally placed new oak staves. The latter mentioned process extends the useful life of the barrel for one or two years before the replacement staves again need to be replaced. Barrels are also prone to leakage and excessive evaporation of the wine in the barrel, requiring constant 'topping off' to minimize the amount of free air inside the barrel. It is this free air that diminishes and ultimately destroys the quality of the wine.

Several proposals have been offered in this century for replicating the action of the oak barrel. U.S. Pat. No. 2,108,661, issued Feb. 15, 1938, to Farrier discloses an early attempt to replicate the oak aging process with the use of a single wooden plug in a container. Said plug has an internal bore to allow oxidation through the wood but the surface area is very limited and insufficient to mature large quantities of wine. The plug also has a lateral bore which in essence obviates any benefit otherwise derived from the device and does not provide for proper aging.

U.S. Pat. No. 2,114,009, issued Apr. 12, 1938, to Ramsey discloses an arrangement wherein a wooden dowel has a bore which is completely open at the bottom end of the dowel and a plurality of longitudinally-spaced lateral bores are formed through the dowel intersecting the longitudinal bore. Such an arrangement does not allow controlled oxidation through the wood itself and desirable aging properties cannot be obtained.

U.S. Pat. No. 2,203,229, issued Jun. 4, 1940 to Nilsson discloses a plurality of different embodiments, and in FIG. 5 discloses an arrangement wherein a wooden dowel has a blind longitudinal bore therein for obtaining oxidation through the dowel itself. This arrangement appears more geared for application in the aging of liquors rather than wines as is relies on filters and vapor traps not suited or required in wine aging. Further the arrangement is more directed at single bottle aging and does not address the aging of volumes of wine that are required by typical commercial operations.

U.S. Pat. No. 3,942,423 issued Mar. 9, 1976 to Herzfeld discloses an arrangement wherein a single wooden dowel has a blind longitudinal bore and a sealing process adapted for use with a glass (carboy) container. Other adaptations suggest that the dowel could be sized differently for other larger containers. This device, which may work satisfactorily on small quantities, is necessarily limited by the percentage of oak surface area contact that can be created by the device's single oak rod. As presented, it has no capability to efficiently and effectively mature larger volumes of wine. The sealing mechanism to prevent intrusion of unwanted air is difficult to adapt to other containers and appears to require additional treatment of the oak dowel to prevent uncontrolled wicking of the wine up the dowel.

U.S. Pat. No. 5,537,913 issued Jul. 23, 1996 to Vowles discloses an arrangement wherein constructed wooden (oak) cylinders are placed in a plurality within an airtight container. The cylinders are shown to be sealed at one end and sealed at the point of entry into the container. Alternately, and arrangement is shown with the cylinders open at both ends but passing through the container and thus requiring seals at both faces of penetration into the container. There are several drawbacks which make this devise overly complex for use in wine making. The first drawback involves the need to fabricate the cylinders out of multiple pieces of wood and accomplish airtight seals at all the adjoining faces of each wood piece. This fabrication in terms of time, cost and leakage potential is not much different then that of conventional barrels. The second major drawback is the cumbersome method of sealing required where the cylinders penetrate the container. Custom and complicated seals are used that raise the specter of unwanted air contamination into the wine and/or leakage of wine from the container.

SUMMARY OF THE INVENTION

Preferred Configuration

The present invention provides an apparatus that allows for the maturation of wine in a variety of food-grade, airtight containers of various sizes and shapes. A slab of French or American white oak is internally. cored to provide continuous air passage throughout the slab. One or more slabs may be connected to each other pneumatically by use of neoprene tubing to allow air exchange from one slab to another. A grouping of slabs thus connected or a single slab is properly spaced to match container geometry and placed inside (i.e. totally submerged) the aging vessel (requires a vessel type with removable airtight lid) with a single neoprene tube connecting from the end of the first slab and penetrating the vessel lid for air intake and another neoprene tube connecting to the last slab and penetrating the vessel lid for air outflow. A positive air pressure is applied to the air intake tube and may contain pure oxygen to aid oxidation. The number, height and length of oak slabs to be used is dependent on the volume and geometry of the aging vessel and the type of wine to be aged. The slabs are one and one half inches in thickness with internal 0.375 inch to 0.5 inch diameter bores. Longitudinal spacing of the bores is one and one half inches on center with the bores being equally spaced from side to side of the oak slab.

DETAILED DESCRIPTION

Further understanding of the disclosure presented herein is described in drawings referenced as:

FIG. 1—Plan view of typical rectangular aging vessel showing removable airtight lid and air inlet and outlet ports.

Figure 2:
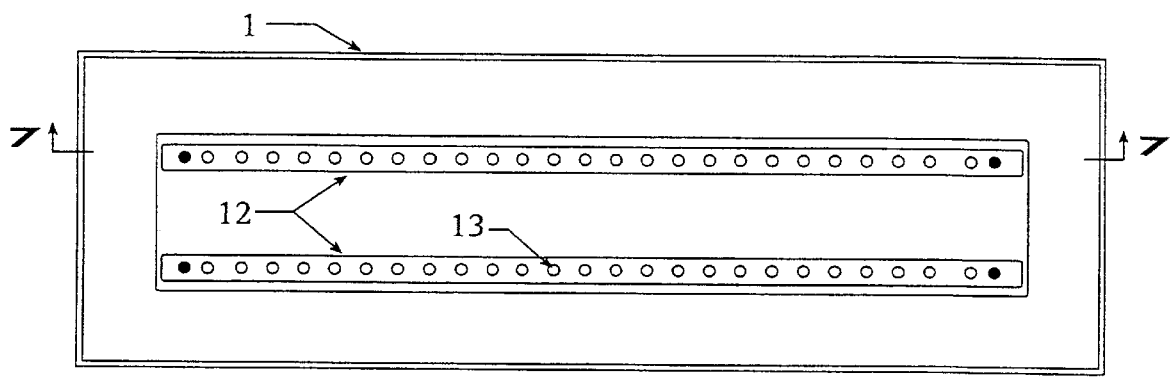

FIG. 2—Cut-away plan view of typical rectangular aging vessel showing cored oak slab insert.

Figure 3:
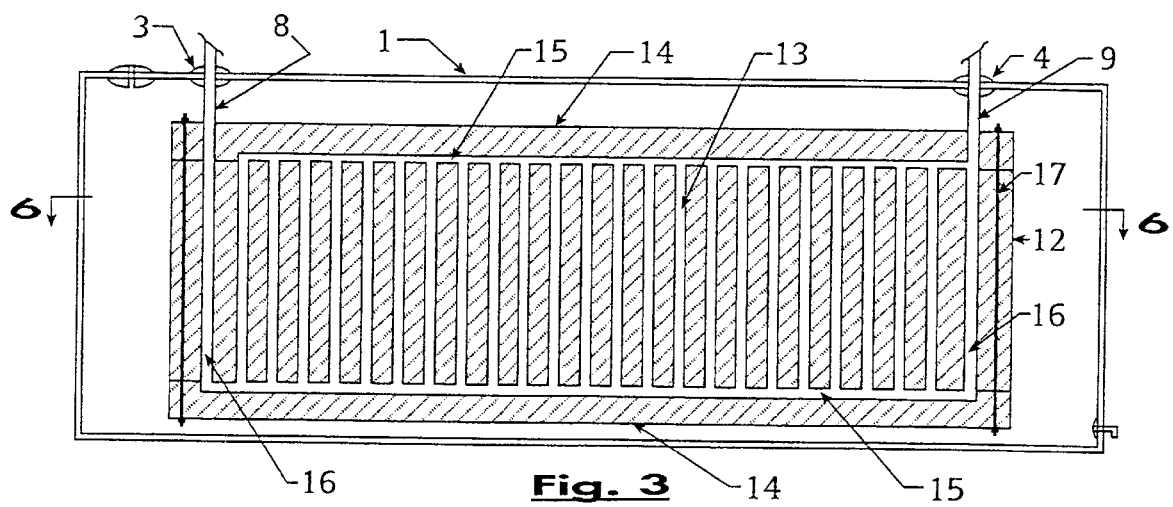

FIG. 3—Cut-away elevation view of typical rectangular aging vessel showing cored oak slab insert.

FIG. 1 discloses in plan view the preferred configuration rectangular aging vessel 1 with removable airtight lid 2 and air intake port 3 and air outlet port 4.

FIG. 2 indicates in cut-away plan view, a typical rectangular aging vessel 1 showing the preferred embodiment of the oak slab inserts. The oak slab unit is comprised of one or more internally cored oak slabs 12 where 0.375 inch to 0.5 inch diameter bores 13 are created within oak slabs of one and one half inch thickness. Longitudinal spacing of the bores is one and one half inches on center with the bores being equally spaced from side to side of the oak slab.

FIG. 3 indicates in cut-away elevation view, the typical rectangular aging vessel 1 showing the oak slab unit with internal bores 13. Oak caps 14 seal the top and bottom of the bores while cross-connecting them with air channels 15. Only the end bores 16 penetrate the oak caps to provide a connection to external air. One end bore is connected pneumatically to external air via a flexible neoprene tube 8 that penetrates the aging vessel top through an air intake port 3. The other and opposite end bore is also connected pneumatically to external air through an air outlet port 4 via a flexible neoprene tube 9 or to another oak slab in a 'daisy chain' manner. A positive air pressure can be applied to one of the external air tubes to introduce fresh air into the cored oak slab(s). The oak caps are held in place by retainer rods 17.

What is claim is:

1. A device for maturing wine under controlled oxidation in the presence of oak, comprising:

(a) one or more cored oak slab elements where each said cored oak slab has a plurality of continuous internal air passages that are connected together by an oak cap containing an internal, cross-connecting air channel and where each said cored oak slab has an air intake port, an air exit port and, (b) a containment vessel into which said cored oak slabs are placed, which is air tight, of food grade material, possesses an airtight operable lid of sufficient dimension to allow insertion and removal of said cored oak slabs from said containment vessel and an air intake port and an air exit port and, (c) food grade neoprene connectors linking said air intake and exit ports in said cored oak slabs with said air intake and exit ports in said containment vessel.

2. The device in claim 1 where said internal air passages may range from 0.375 inches to 0.5 inches diameter.

3. The device in claim 2 where said cored oak slabs are a minimum 1.5 inches in width and of variable height and length.

4. The device on claim 1 where said cored oak slab replacement is accomplished in said aging vessel by removing said airtight operable lid, disconnecting said air intake and air exit connectors, exchanging said cored oak slabs, reconnecting said air intake and air exit connectors and replacing said airtight operable lid.

* * * * *